UNITED STATES PATENT OFFICE.

THOMAS R. HUBBARD, OF BROOKLYN, NEW YORK.

IMPROVEMENT IN POLISHING-POWDERS.

Specification forming part of Letters Patent No. 129,029, dated July 16, 1872.

Specification describing a new and Improved Topaz Product, invented by THOMAS R. HUBBARD, of Brooklyn, in the county of Kings and State of New York.

This invention has for its object to utilize the deposits of topaz found in the United States, and more particularly its hardness and heat-resisting quality.

Being found in a comparatively pure state, and of great hardness, the topaz is admirably adapted to the resisting, abrading, and polishing of metals and other mineral and other substances, and will be of use, therefore, in the construction of burglar-proof safes and vaults, and in the manufacture of hones and stones for sharpening, grinding, shaping, and polishing tools or goods, and for other similar purposes. Its heat-resisting qualities make it useful on fire-proof structure of every kind.

The manner in which I propose to carry out my invention consists in reducing the topaz to small or coarser particles, or to fine powder, and then cementing the particles, either direct or by means of admixture of other substances, of which I prefer alumina and clay. The powdered topaz or mixture containing it can then be subjected to pressure and heat, or either, and will thereby receive the requisite shape and condition.

There is a form of sapphire or corundum which is called "yellow topaz" or oriental topaz. I do not propose to use this species of mineral, but that species whose distinctive name is "topaz," and which is an entirely different article. The mineral species "yellow topaz," including corundum and emery, is pure alumina crystallized, of a hardness of 9 and specific gravity of about 4. Topaz is a mineral species, composed of three elements, viz.: Silica 34.2, alumina 57.4, and fluoric acid 7.8. Its hardness is 8 instead of 9, and its specific gravity about 3.5 instead of 4. All the books on mineralogy treat these two minerals as entirely different species, and they undoubtedly are so.

The species "yellow topaz" contains no silica or fluoric acid, which are essential to my purpose.

The proportion in which the ingredients are to be combined with the topaz to some extent differ, and the processes of preparation vary somewhat with the several purposes contemplated. As an example, one of the purposes for which it is intended to be used is making hones for abrading steel tools. As tools are hardened to a different degree for different uses in the trades, a difference in the preparation is required for different trades, and a different proportion of the elements. It would not, therefore, be possible to assign definite proportions of those elements in all its applications.

I can only say, in the general, that it is proposed to reduce the topaz to a powder more or less fine, and to incorporate it with alumina and silex or clay as cementing materials. With this general statement any person, whether skilled or not in manipulations, would be able to prepare the material for any of its several uses.

Having thus described my invention, what I claim as new, and desire to secure by Letters Patent, is—

The described topaz ground to powder and incorporated with alumina and silex, as and for the purposes described.

THOMAS R. HUBBARD.

Witnesses:
T. B. MOSHER,
W. A. GRAHAM.